April 23, 1957

J. CALLING 2,790,111

ELECTRICAL CAPACITOR ARRANGEMENTS

Filed Sept. 11, 1953

INVENTOR
JOHN R. CALLING

ATTORNEY

United States Patent Office 2,790,111
Patented Apr. 23, 1957

2,790,111

ELECTRICAL CAPACITOR ARRANGEMENTS

John Calling, Evansville, Ind., assignor, by mesne assignments, to Whirlpool-Seeger Corporation, a corporation of Delaware Application September 11, 1953, Serial No. 379,670

6 Claims. (Cl. 317—99)

This invention relates generally to electrical capacitors, and more specifically to an improved arrangement for mounting specific electrical capacitors.

As is well known in the art, applications providing for the use of electric motors having a rating of two or more horsepower are often provided with a plurality of starting capacitors to aid the starting of these motors. These electrical capacitors are usually of the type wherein a sealed can is provided with the laminations of the capacitor mounted therein in an oil solution. Since these capacitors must be frequently checked, it is desirous that they be mounted in an assembly wherein removal and replacement thereof may be easily accomplished in a rapid and efficient manner, with a minimum of electrical shock danger to the tester.

Therefore, it is an object of this invention to provide an electrical capacitor assembly wherein the capacitors may be easily and safely removed and replaced for checking or replacement thereof.

It is a further object of this invention to provide an electrical capacitor assembly wherein efficient and positive connections are maintained between the various current-carrying portions of the assembly.

It is a feature of this invention that a novel catch is provided in conjunction with a specific type of electrical capacitor.

Other objects and features of the present invention will be apparent upon a perusal of the following specification and drawing of which:

Figures 1, 2:
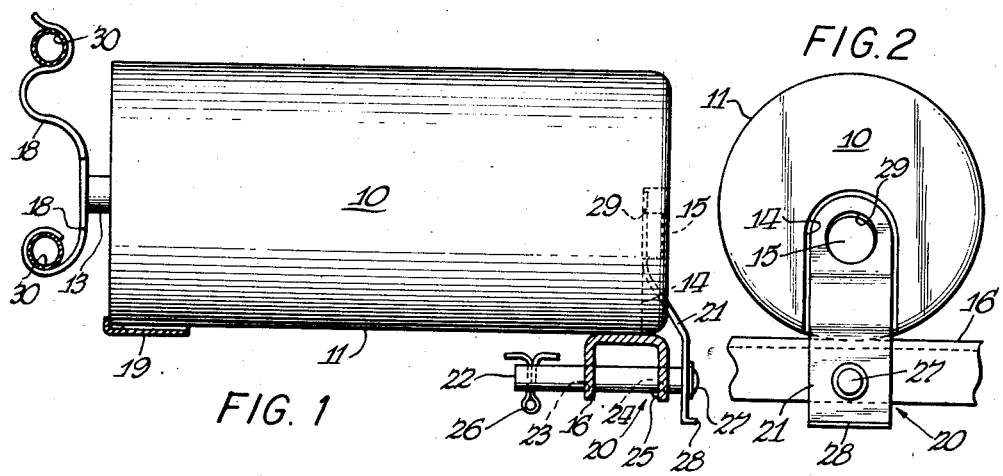
Figure 1 is a side plan view of a portion of the present invention.
Figure 2 is a top plan view of a portion of the invention shown in Figure 1.

The present embodiment is the preferred embodiment, but it is to be understood that changes can be made in the present embodiment by one skilled in the art without departing from the spirit and scope of this invention.

For a detailed description of the invention, reference is made to the drawing. The electrical capacitor 10 is of the type which is sealed in a can 11, the can 11 completely encloses the electrical capacitor except for an open portion at the bottom thereof. An electrical insulator 12 is mounted within the opening at the bottom thereof and two electrodes 13 extend outwardly from the surface thereof. Electrodes 13 are connected to the capacitor assembly within the can 11. The opposite end of the electrical capacitor 10 has a depressed portion 14 formed in the surface thereof. The shape of the depressed portion 14, which is finger-shaped, may easily be seen in Figures 1 and 2. A circular projection 15 is formed to extend from the surface of the depression 14 in an area between the center of the can 11 and the periphery thereof.

Figure 4:
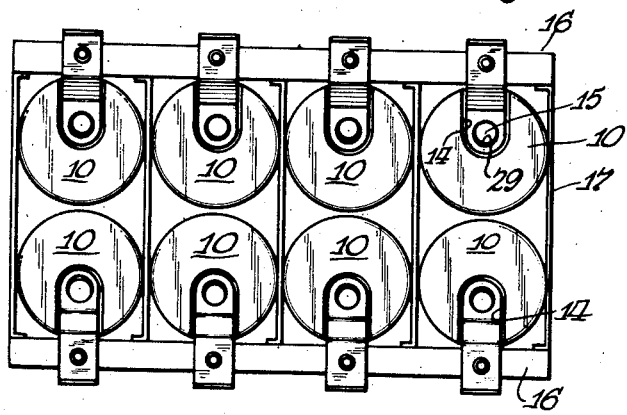
Figure 4 is a top plan view of the present invention as a complete assembly.

As is well known in the art, capacitor arrangements generally provide for the use of a plurality of capacitors. The present invention provides a frame assembly for such an arrangement, as can be seen in Figure 4. The frame assembly comprises a pair of U-shaped channels 16. The channels 16 are mounted parallel to each other and are spaced some distance apart, approximately twice the diameter of the capacitor 10, by a plurality of walls 17 mounted to said channels 16 by any means well known in the art. The walls 17 are spaced apart a distance substantially equal to the diameter of the capacitor 10. Any conventional bus bars (not shown) may be mounted beneath the walls 17 for connection to the electrodes 13 of the capacitor 10. Pairs of resilient springs 18 which are formed of a material which is a good conductor of electricity may be connected to the bus bars 30 and positioned for contact with the terminals 13. Further, an L-shaped channel may be mounted to the walls 17 at the lower end thereof. The L-shaped channel 19 will serve to correctly align the lower portion of the capacitor 10 to the resilient springs 18. It can thus be seen that a plurality of capacitors 10 may be inserted between the walls 17 and the channels 16, and if the plurality of capacitors 10 are in correct rotational alignment, each of the terminals 13 will contact one of the resilient springs 18.

Figure 3:
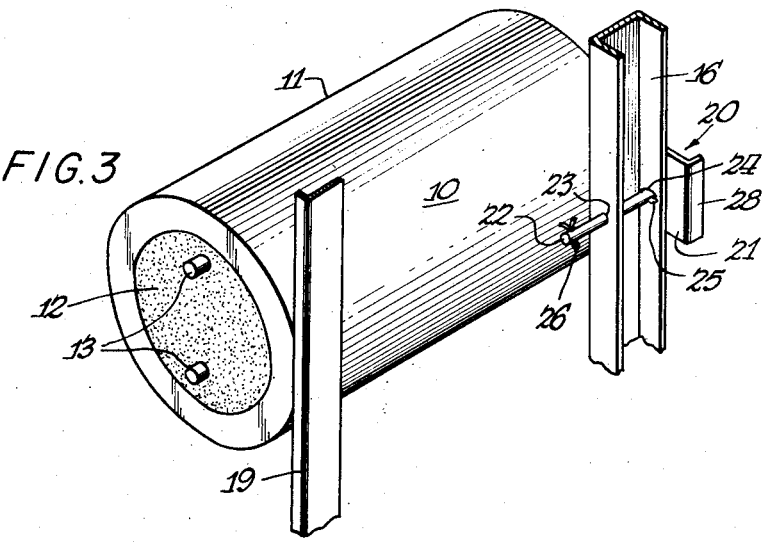
Figure 3 is an isometric view of the portion of the present invention shown in Figure 1 with a substantial enlargement of the catch assembly in relation to the capacitor.

To secure the capacitor 10 between the channels 16 and the walls 17 in proper rotational alignment with the bus bars 30, and to permit easy removal thereof, a catch arrangement 20 is provided for cooperation with the previously described depression 14 and projection 15. The catch arrangement 20 comprises a resilient spring 21, and a specific shaft 22 secured thereto. Two holes 23 and 24 are formed through portions of the U-shaped channel 16, as can easily be seen in Figure 3. The hole 24 is elliptical in shape and has a major axis substantially larger than the diameter of the shaft 22. The shaft 22 is formed to have a tooth 25 formed as an integral part thereof, as can easily be seen in Figures 1 and 3. One end of the shaft 22 is formed to have a hole transversely therethrough and a cotter pin 26 is secured therein. The other end of the shaft 22 is rigidly secured to the resilient spring 21 by mounting means 27. The resilient spring 21 is formed of a ribbon material, such as spring steel, which is formed to assume the shape of a distorted S curve, as can easily be seen in Figures 1 and 2. The end of the resilient spring 21, adjacent to the portion thereof wherein the shaft 22 is mounted, is formed to have a flange 28 thereon. The other end of the resilient spring 21 is formed to a shape similar to the shape of the depressed portion 14. Further, the resilient spring 21 has an opening 29 formed therein. The opening 29 is of a diameter slightly larger than the diameter of the projection 15. The length of the spring 21 from the mounting means 27 to the further end thereof, measured along the curved surface of spring 21, is greater than the distance from the mounting means 27 to the inner edge of the depression 14.

In order to clearly describe the operation of the instant invention, the operation thereof to remove the capacitor 10 from the remainder to the assembly will be described first. To release the capacitor 10, pressure is applied to the flange 28 in a direction transverse to the longitudinal axis of the shaft 22. The applied pressure will cause the resilient spring 21 to be slightly deformed, and the portion of the shaft 22 extending through the opening 24 will be moved toward the capacitor 10 until the tooth 25 is clear of the edge of the hole 24. The bias of the resilient spring 21 will then snap the shaft 22 in a direction along the longitudinal axis of the shaft 22 until the cotter pin 26 engages the portion of the U-shaped element 16 adjacent to the hole 23. The opening 29 in the resilient spring 21 will then be disengaged from the projection 15 and the depression 14, and the resilient spring 21 may then be pivoted about the longitudinal axis of the shaft 22 to one side of the capacitor 10. The capacitor 10 may then be easily removed from the assembly and may be tested. The capacitor 10 is removed from the assembly by a grasping thereof adjacent to the end thereof opposite from the end having the electrodes 13 mounted therein. Thus, it can be seen that the capacitor 10 may be easily removed from the assembly without any danger of electrical shock to the operator.

To replace the capacitor 10 within the assembly, the capacitor 10 is inserted between the walls 17 and the U-shaped elements 16, adjacent to one of the U-shaped elements 16. The depression 14 is rotatively aligned to one of the U-shaped elements 16, as seen in Figures 2 and 4. The resilient spring 21 is then rotated about the longitudinal axis of the shaft 22 until the resilient spring 21 is immediately above the depresson 14. Pressure is then brought to bear against the mounting means 27 in a direction along the longitudinal axis of the shaft 22. This will cause the end of the resilient spring 21 adjacent to the inward portion of the depression 14 to engage the depression 14. The opening 29 will engage the projection 15, and the shaft 22 will be moved through the holes 23 and 24. As the shaft 22 is moved through the holes 23 and 24, one peripheral edge of the opening 29 will engage one peripheral edge of the projection 15, as can be seen in Figure 2. The resilient spring 21 will then be biased, and when the tooth 25 passes through the opening 24, the bias of the resilient spring 21 will cause the tooth 25 to engage a portion of the U-shaped element 16 adjacent to the hole 24, as can easily be seen in Figures 1 and 3. The electrodes 13 will then be properly seated against the contact springs 18, due to the correct rotational alignment of the capacitor 10, and due to the bias of the resilient spring 21 projecting against the capacitor 10.

Having described the invention what is considered new and desired to be protected by Letters Patent is:

1. In a mounting arrangement for an electrical capacitor having a depression formed in one end thereof, and having a projection formed to extend from said depression, the combination of a U-shaped frame member having two openings therethrough positioned along a common axis, one of said openings being formed to have an elliptical shape, a shaft slidably mounted within said openings, a resilient spring secured at one end thereof to one end of said shaft, the other end of said resilient spring being shaped to conform to the shape of said depression and having a hole therethrough, said shaft having a tooth formed thereon for cooperation with said elliptical opening, whereby said shaft is axially slidable to cause said other end of said resilient spring to engage said depression with said projection engaging said hole in said resilient spring to bias said resilient spring to cause said tooth to engage one edge of said elliptical opening.

2. In a mounting arrangement for an electrical capacitor formed in the shape of a longitudinal can, one end of said can being open, said open end of said can being provided with an insulator mounted thereacross, a pair of electrodes mounted to said insulator and extending therefrom, the other end of said electrical capacitor being provided with a depression formed therein, a projection formed to extend from said depression, the combination of a U-shaped frame member having two openings therethrough positioned along a common axis, one of said openings being formed to have an elliptical shape, a shaft slidably mounted within said openings, a resilient spring secured at one end thereof to one end of said shaft, the other end of said resilient spring being shaped to conform to the shape of said depression and having a hole therethrough, said shaft having a tooth formed thereon for cooperation with said elliptical opening, electrical conductor means mounted to abut said electrodes, said electrical capacitor mountable between said electrical conductor means and said resilient spring, whereby said shaft is axially slidable to cause said tooth to releasably engage one edge of said elliptical opening, and whereby said other end of said resilient spring is biased to releasably engage said depression with said projection engaging said hole in said resilient spring.

3. In a mounting arrangement for an electrical capacitor formed in the shape of a longitudinal can, one end of said can being open, said open end of said can being provided with an insulator mounted thereacross, a pair of electrodes mounted to said insulator and extending therefrom, the other end of said electrical capacitor being provided with a depression formed therein, said depression being finger shaped and extending substantially from the center of said one end of said electrical capacitor to the periphery thereof, a projection formed to extend from said depression, the combination of a frame assembly, electrical conductor means mounted at the lower end of said frame assembly, said electrical capacitor positionable within said frame assembly with said pair of electrodes positioned to abut said electrical conductor means, said frame assembly having a U-shaped member disposed adjacent said other end of said electrical capacitor and transversely to the longitudinal axis of said depression, said U-shaped member having two openings therethrough positioned along a common axis normal to the longitudinal axis of said depression, one of said openings being formed to have an elliptical shape, a shaft slidably mounted within said openings, a resilient spring secured at one end thereof to one end of said shaft, the other end of said resilient spring being shaped to conform to the shape of said depression and having a hole therethrough, said shaft having a tooth formed thereon for cooperation with said elliptical opening, whereby said shaft is axially slidable to cause said tooth to releasably engage one edge of said elliptical opening, and whereby said other end of said resilient spring is biased to releasably engage said depression with said projection engaging said hole in said resilient spring.

4. In a mounting arrangement for a plurality of electrical capacitors, wherein each of said electrical capacitors is formed in the shape of a longitudinal can with one end of each of said cans being open and with said open end of each of said cans being provided with an insulator mounted thereacross, and further having a plurality of pairs of electrodes, each pair of electrodes mounted to one of said insulators and extending therefrom, the other end of each of said electrical capacitors being provided with a depression formed therein, a plurality of projections, each of said projections formed to extend from one of said depressions, said mounting arrangement comprising a frame assembly, said electrical capacitors positionable within said frame assembly in a parallel relationship to each other, said frame assembly being provided with a U-shaped frame member, said U-shaped frame member having a plurality of pairs of openings therethrough, each of said pairs of openings positioned along a common axis, one opening of each of said pairs of openings being formed to have an elliptical shape, a plurality of shafts, each of said shafts slidably mounted within one of said pairs of openings, a plurality of resilient springs, each of said resilient springs secured at one end thereof to one end of one of said shafts, the other end of each of said resilient springs being shaped to conform to the shape of said depressions and having a hole therethrough, each of said shafts having a tooth formed thereon for cooperation with said elliptical openings, electrical conductor means mounted to abut said electrodes, said electrical capacitors further positionable between said electrical conductor means and said resilient springs, whereby each of said shafts is axially slidable to cause each of said teeth to releasably engage one edge of each of said elliptical openings, and whereby said other end of each of said resilient springs is biased to releasably engage said depressions with said projections engaging said holes in said resilient springs.

5. In a mounting arrangement for a plurality of electrical capacitors, each of said electrical capacitors formed in the shape of a longitudinal can, one end of each of said cans being open, said open end of each of said cans being provided with an insulator mounted thereacross, a plurality of pairs of electrodes, each pair of electrodes mounted to one of said insulators and extending therefrom, the other end of each of said electrical capacitors being provided with a depression formed therein, said depressions being finger-shaped and extending substantially from the center of said one end of said electrical capacitors to the peripheries thereof, a plurality of projections, each of said projections formed to extend from one of said depressions, the combination of a frame assembly, electrical conductor means mounted at the lower end of said frame assembly, each of said electrical capacitors positionable within said frame assembly with each of said pairs of electrodes positionable to abut said electrical conductor means, said frame assembly having a U-shaped member disposed adjacent said other ends of each of said electrical capacitors and transversely to the longitudinal axes of said depressions, said U-shaped member having a plurality of pairs of openings, each of said pairs of openings positioned along a common axis normal to the longitudinal axis of one of said depressions, one opening of each of said pairs of openings being formed to have an elliptical shape, a plurality of shafts, each of said shafts slidably mounted within one of said pairs of openings, a plurality of resilient springs, each of said resilient springs secured at one end thereof to one end of one of said shafts, the other end of each of said resilient springs being shaped to conform to the shape of said depression and having a hole therethrough, each of said shafts having a tooth formed thereon for cooperation with said elliptical openings, whereby each of said shafts is axially slidable to cause said teeth to releasably engage one edge of each of said elliptical openings, and whereby said other end of said resilient springs are biased to releasably engage said depressions with said projections engaging said holes in said resilient springs.

6. A mounting assembly for an electrical capacitor having a depression formed in its rear end and having a pair of spaced insulated contact pins projecting from its front end, comprising oppositely extending resilient contacts carried by separate bus bars and located to engage said contact pins separately, a channelled member for supporting the capacitor by engaging its side adjacent its rear end, said channelled member having parallel flanges extending away from and transversely to the length of the capacitor, said flanges having a pair of aligned openings, a plunger in said aligned openings, said plunger having an open position stop and a closed position stop, said plunger carrying a laterally projecting arm fitting in said depression and so orienting the capacitor rotatively that the contact pins engage said resilient contacts separately, said closed position stop comprising a lug formed on the plunger adjacent one flange of said channel, and the aperture in said channel having a radial slot to pass said lug, the closed position stop holding the capacitor contact pins against said resilient contacts.

References Cited in the file of this patent
UNITED STATES PATENTS

| | | |
|---|---|---|
| 1,937,010 | Dubilier | Nov. 28, 1933 |
| 2,158,868 | Stacy | May 16, 1939 |
| 2,460,903 | Peck | Feb. 8, 1949 |